Figure 1:
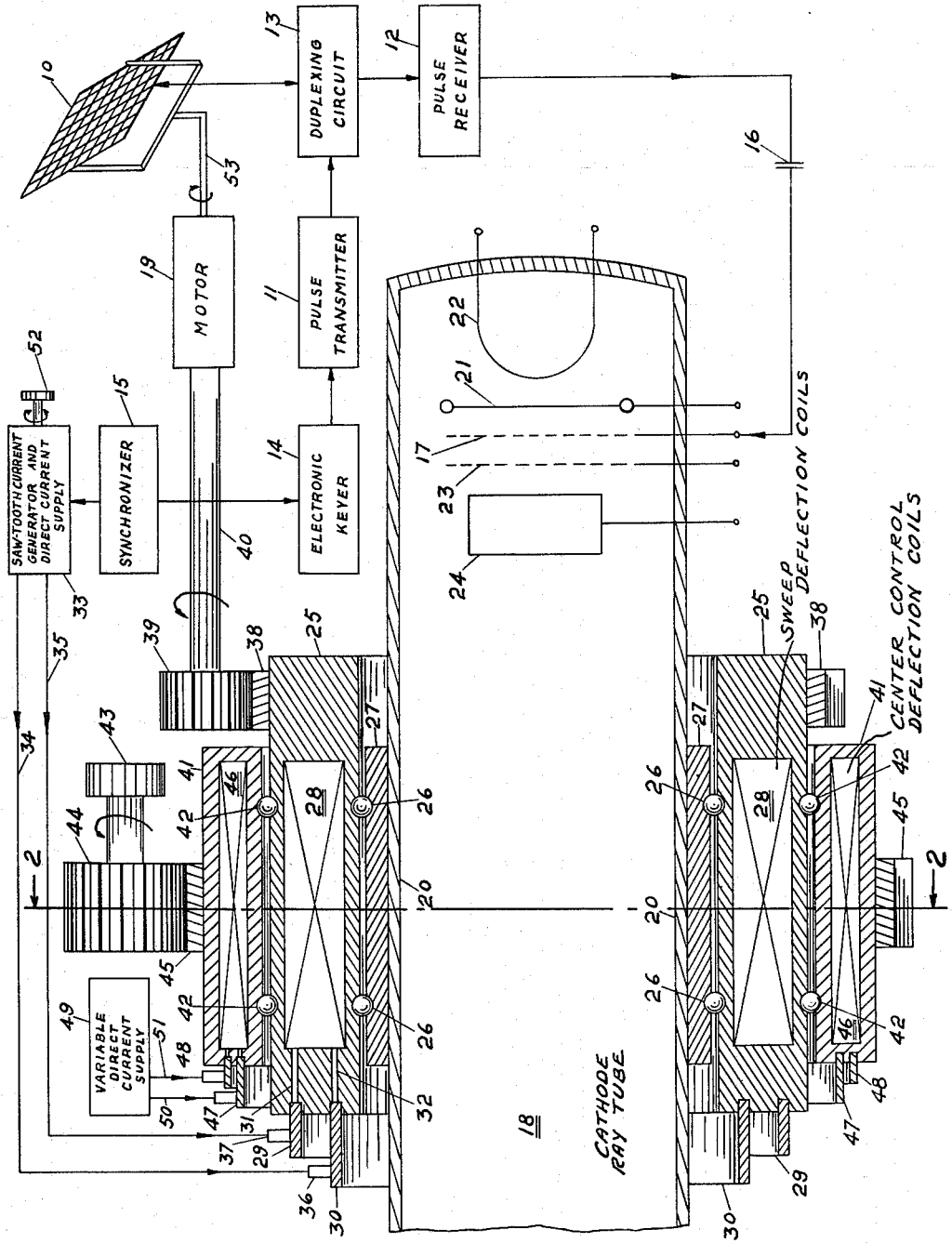

Feb. 24, 1953  R. M. PAGE  2,629,866

POSITION INDICATING APPARATUS

Filed Sept. 19, 1942  2 SHEETS—SHEET 1

INVENTOR
ROBERT M. PAGE
BY
ATTORNEY

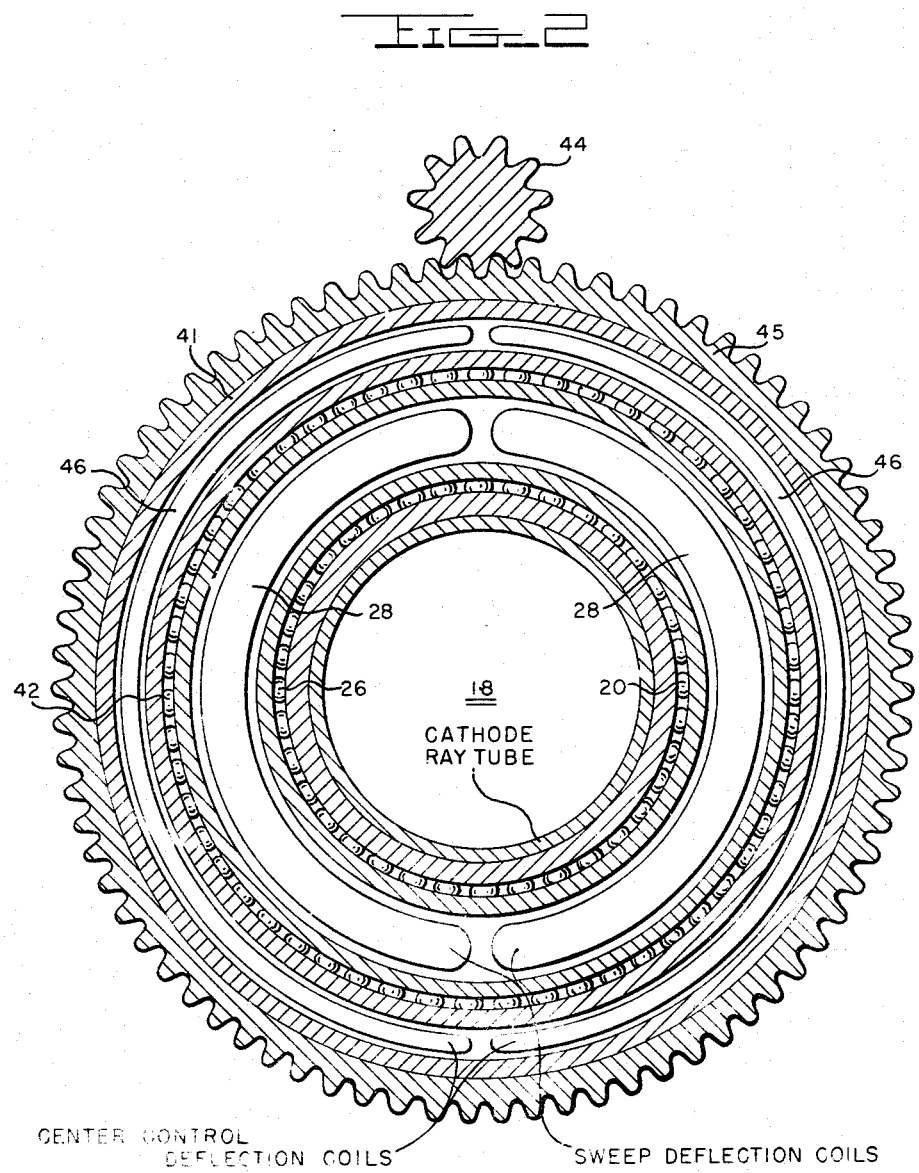

Patented Feb. 24, 1953

2,629,866

UNITED STATES PATENT OFFICE 2,629,866

POSITION INDICATING APPARATUS

Robert M. Page, Washington, D. C.

Application September 19, 1942, Serial No. 459,010

6 Claims. (Cl. 343—11)

(Granted under Title 35, U. S. Code (1952), sec. 266)

This invention relates to radio echo apparatus and more particularly to methods of and means for detecting the presence of remote objects included within a field extending 360° about a reference point and for producing visual plan position indication of such area whereon detected remote objects are indicated in such a manner as to simultaneously show range and direction thereof.

Radio echo apparatuses disclosed by the prior art include a directional beam antenna from which equally spaced energy pulses are emitted at a constant rate, and an indicator, such as a cathode ray oscillograph, upon which a time sweep is impressed in synchronism with the energy pulses emitted from the antenna. When the emitted energy pulses impinge upon remote objects, echo pulses are reflected from the objects and applied to the indicator in such a manner as to produce an indication on the sweep which portrays a measurement of range of the remote object from which the echo pulse reflected. In the prior system directional indications of remote objects detected in the foregoing manner are derived from the angular position of the directional beam antenna. Directional indications obtained in this manner are not of a high degree of accuracy since the directional energy beam emitted from the antenna must necessarily have substantial widths, approximately equal to an arc of 10 to 15 degrees, and echo pulse indications are therefore produced on the indicator whenever a remote object is included within any portion of the beam. Consequently, it becomes necessary to continually adjust the antenna bearing until echo pulse indications of maximum amplitude are produced, in which case it is assumed that the middle of the directional energy beam, the portion thereof having the greatest power, is directed toward the object, and also that the antenna is likewise pointing directly toward the object. The latter operations are extremely difficult to perform rapidly with a high degree of accuracy, and the prior systems are therefore only capable of indicating approximate bearings of remote objects.

From the foregoing it can be readily seen that numerous difficulties arise when attempting to determine range and directional indications of remote objects with a system of conventional construction. As mentioned above, directional indications, when obtained, are not of a high degree of accuracy, and furthermore, it becomes extremely difficult to obtain a directional indication of a remote object corresponding to a remote object indication produced on the indicator since the means for indicating range and bearing are distinct, isolated devices. Difficulties arising because of the latter are more readily comprehended when attempting to determine range and direction of all remote objects included within a field extending 360° about the apparatus. It is necessary, in the latter instance, to slowly rotate the antenna by extremely small increments throughout 360° and to continually record the echo pulse indications appearing on the indicator for each position of the antenna. When considering the tedious operations required to obtain approximate bearing indications, the fallacies of the foregoing method are obvious, especially in instances wherein the remote objects are moving at high velocities, such as aircraft, for example.

It is therefore an object of the present invention to provide a novel method for indicating range and direction of remote objects.

Another object is to provide novel means for indicating range and direction of remote objects.

Another object is to provide novel means for simultaneously indicating range and direction of remote objects on an oscillograph by use of separate coordinates.

Another object is to provide a novel radio echo apparatus for producing a plan position indication of remote objects included within a field extending 360° about the apparatus, with the indication of each object simultaneously showing range and direction thereof.

Still another object of the present invention is to provide a novel method for producing a rotating radial sweep of the electron beam of an oscillograph.

Still another object is to provide novel means for producing a rotating radial sweep of the electron beam of an oscillograph.

Still another object is to provide a radio echo apparatus including novel means for producing a radial time sweep of the electron beam of an oscillograph and for rotating the sweep in synchronism with rotation of the antenna of the apparatus whereby range and directional indications of remote objects included within a field extending 360° about the apparatus are simultaneously obtained from the indications produced on the oscillograph.

Still another object is to provide novel electromagnetic means for producing a rotating radial sweep of the electron beam of an oscillograph.

Still another object is to provide a radio echo apparatus having an oscillograph with means for producing a rotating radial sweep of the electron beam thereof, including novel means for varying the point about which the sweep rotates.

Other objects and features of the invention will appear more fully hereinafter from the following detailed description when considered in connection with the accompanying drawings which discloses a radio echo apparatus embodying the principles of the present invention. It is to be expressly understood, however, that the drawings are designed for purposes of illustration only and not as a definition of the limits of the invention, reference for the latter purpose being had to the appended claims.

In the drawings, wherein similar reference characters denote similar elements throughout the several views:

Fig. 1 is a diagrammatic illustration, partly in section, of a radio echo apparatus embodying the principles of the present invention, and Fig. 2 is a sectional illustration through line 2—2 of Fig. 1.

It is contemplated by the present invention to produce a highly directive beam of energy, such as a series of equally spaced radio frequency pulses, which is continually rotated to scan an area extending 360° about a reference point with the directive energy, and to produce a radial sweep of the electron beam of an oscillograph which rotates about a fixed point on the oscillograph screen in synchronism with rotation of the directional energy beam. The rate of emission of the directional energy is synchronized with the radial sweep of the electron beam so that energy reflected from remote objects included in the scanned area produces indications on the sweep, at certain distances from the rotating ends thereof, which are direct measurements of range of the remote object from which the energy reflected, while the angular position of the sweep, at the instant a reflected energy indication is produced thereon, represents the direction of the remote object. With an apparatus having the foregoing characteristics, a visual plan position indication is produced on the oscillograph screen which portrays the remote objects included within the scanned area at certain radial and angular positions with respect to the center of the oscillograph screen in a manner corresponding to the range and direction of remote objects with respect to the apparatus. An indication of the foregoing type is disclosed and described more fully in the application of H. G. Busignies, Serial No. 380,982, filed February 28, 1941, for Distance and Direction Indicating System and now Patent 2,468,032.

With reference more particularly to the drawings, the radio echo apparatus constructed in accordance with the principles of the present invention that is disclosed therein includes directional beam antenna 10, pulse transmitter 11 and pulse receiver 12. Transmitter 11 and receiver 12 are connected to antenna 10 by means of duplexing circuit 13 which automatically functions to form individual connections between the transmitter and the antenna, and between the antenna and the receiver so that a single antenna is employed for transmission as well as reception. The output of transmitter 11 is modulated by electronic keyer 14 in such a manner that the former produces equally spaced energy pulses, such as radio frequency pulses, at a rate determined by synchronizer 15 which controls operation of keyer 14, which are emitted from antenna 10 in the form of a directional energy emission. Energy received at the antenna is passed through receiver 12 and coupling condenser 16 to control grid 17 of oscillograph 18, to modulate the intensity of the electron beam of the oscillograph. Antenna 10 is rotated, in a horizontal plane for example, by means of motor 19 through shaft 53, so that the directional energy pulses emitted from the antenna may be scanned over an area extending 360° about the antenna, or through any desired angle. Antenna 10 is to be of any suitable construction capable of producing a highly directive energy emission, and transmitter 11 and receiver 12 are designed in such a manner as to properly transmit and receive pulse energy, such as transmitters and receivers employed in conventional television equipment. Oscillograph 18 is of conventional construction in so far as the same comprises an evacuated cylindrical envelope 20 having a viewing screen, not shown, at one end, with electron emitting means mounted in the other end thereof. The electron emitting means includes cathode 21, heater element 22, grid 23 and anode 24, from which the electrons are emitted at extremely high velocities toward the viewing screen.

As mentioned heretofore, it is an object of the present invention to provide novel electromagnetic means associated with oscillograph 18 for continually radially deflecting the electron beam emitted from cathode 21 in synchronism with the pulse energy emitted from antenna 10 in a direction corresponding to the direction of the pulse energy emission from the antenna. As shown in the drawing, the foregoing means comprises cylindrical coil supporting member 25 mounted for rotation about the outer periphery of envelope 20 by means of anti-friction bearings 26 which cooperate with member 25 and race member 27; the latter member being secured to the outer periphery of envelope 20, between the electron beam emitting means and the oscillograph viewing screen, by any suitable means. Deflection coils 28, 28 are carried by member 25 and are electrically connected to slip rings 29 and 30 through conductors 31 and 32. The aforementioned means also includes saw-tooth wave generator 33 of conventional design to produce saw-tooth varying currents, as well as a source of constant direct current, the purpose of the latter will appear more fully hereinafter. Synchronizer 15 is connected to generator 33 to control operation of the latter in such a manner that generation of saw-tooth current wave forms are initiated at the instant an energy pulse is generated at transmitter 11. The output of generator 33 is fed to deflection coils 28, 28 through conductors 34 and 35 which respectfully terminate at contacts 36 and 37 slidably mounted on slip rings 29 and 30.

Deflection coils 28, 28 are diametrically mounted in supporting member 25 and are wound in such a manner as to produce a uniform uni-directional electromagnetic field therebetween, that passes through envelope 20, when a source of direct current is applied thereto. Application of saw-tooth current wave forms to the deflection coils produces a uniform electromagnetic field between the coils, the strength of which varies at a constantly increasing rate, from a field of zero strength, at the originating point of the saw-tooth wave forms, to a field of maximum strength when the saw-tooth wave forms attain maximum current values. The electron beam emitted from cathode 21 normally moves along the central axis of envelope 20; however, when a saw-tooth varying electromagnetic field is applied between the deflection coils, the electron beam is deflected, in a direction at right angles to the direction of the electromagnetic field, by an amount directly proportional to the strength of the field. It is to be expressly understood, therefore, that the electron beam is radially moved from the center of the oscillograph screen upon application of each saw-tooth wave form to the deflection coils. When a series of saw-tooth current wave forms are applied to the deflection coils, a constant direct current, the average current value of the saw-tooth wave forms, produces a constant electromagnetic field between the coils. The constant field tends to maintain the electron beam at some position remote from the central axis of envelope 20. Since, as mentioned heretofore, an object of the present invention is to produce a radial sweep of the electron beam, that is, a sweep that originates at the center of the oscillograph screen, a source of direct current is also applied to the deflection coils, by way of conductors 34 and 35, of the proper polarity to produce an electromagnetic field in opposition to the constant field produced by the aforementioned average direct current. With the foregoing arrangement the electron beam is radially moved from the center of the oscillograph screen upon application of each saw-tooth current wave form.

In order to rotate the radial sweep of the electron beam in synchronism with rotation of antenna 10 in such a manner that the electron beam continually moves in a direction corresponding to the direction of emission of the directional energy from the antenna, means are provided for synchronizing the angular positions of coil supporting member 25 and antenna 10, and for rotating the member and the antenna in such a manner as to continually maintain such synchronous angular relationship. As shown, the foregoing means comprises annular gear 38, secured to the outer periphery of coil supporting member 25 at one end thereof, and pinion 39, rotatably connected to motor 19 through shaft 40, which cooperates with annular gear 38. The driving connections between motor 19 and antenna 10, and between the motor and coil supporting member 25, are so designed that coil supporting member 25 rotates through a complete revolution during the time required to rotate antenna 10 throughout 360°, while the coil supporting member is angularly positioned about the oscillograph in such a manner that the electron beam moves in a direction corresponding to the direction of emission of the directional energy from the antenna.

As previously mentioned, means are provided by the present invention for varying the point about which the radial sweep of the electron beam rotates to any desired position within or outside the oscillograph screen. By varying the point about which the radial sweep rotates, and by expanding the length of the sweep, any desired portion of the area scanned by the directional energy emitted from the antenna may be indicated on the entire area of the oscillograph screen. With an arrangement having the foregoing characteristics, indications of objects, at extreme remote positions with respect to the apparatus, are obtained in such a manner that range and directional indications thereof are rapidly obtained with a high degree of accuracy, as will appear more fully hereinafter.

The foregoing means comprises cylindrical coil supporting member 41 rotatably mounted about the outer periphery of member 25 by means of anti-friction bearings 42. Member 41 is rotated upon manual movement of knob 43 which is secured to pinion 44, while the latter element cooperates with annular gear 45 mounted on the outer periphery of member 41. Deflection coils 46, 46 are carried by member 41 in diametric relation, and are wound in such a manner as to produce a uniform uni-directional electromagnetic field between the coils, and through envelope 20, when a source of direct current is applied to the coils. The deflection coils are connected to slip rings 47 and 48 carried by member 41. The output of variable direct current supply 49 is fed to deflection coils 46, 46 through conductors 50 and 51, each of which terminate in contacts that cooperate with slip rings 47 and 48. When it is desired to move the point about which the radial sweep of the electron beam rotates, the output of supply 49 is regulated until the direct current fed to coils 46, 46 produces an electromagnetic field of sufficient strength to deflect the electron beam of the oscillograph the desired amount from the center of the oscillograph screen. Member 41 is then rotated, upon manual movement of knob 43, to vary the direction that the electron beam is moved until the desired angular position thereof is obtained. In order to expand the radial sweep of the electron beam, the amplitude of the saw-tooth current wave forms from generator 33 is increased upon adjustment of control 52 associated with the generator.

As mentioned heretofore, transmitter 11 produces a series of equally spaced energy pulses, such as radio frequency pulses, upon operation of keyer 14, at a rate controlled by synchronizer 15, which are emitted from antenna 10 in the form of a highly directive energy pulse emission. Synchronizer 15 also controls operation of saw-tooth generator 33 in such a manner that generation of a saw-tooth current wave form is initiated at the instant an energy pulse is generated at the transmitter. The saw-tooth varying current output, as well as a source of direct current, from generator 33 is applied to deflection coils 28, 28 to produce a uni-directional saw-tooth varying electromagnetic field within envelope 20 which radially deflects the electron beam emitted from antenna 24, upon application of each saw-tooth wave form to the coils. Since antenna 10 and coil supporting member 25 are synchronously rotated upon operation of motor 19, the electron beam continually radially sweeps in a direction corresponding to the direction that the energy pulses are emitted from the antenna.

When antenna 10 is continually rotated to scan an area extending 360° about the antenna with the directional energy emission, the energy pulses impinge upon and reflect from all remote objects included within the scanned area. The reflected energy pulses are received at antenna 10, passed through receiver 12 and applied to control grid 17 of oscillograph 18, by way of condenser 16, to modulate the intensity of the electron beam thus producing a visual indication on the oscillograph screen. Since the electron beam initiates radial movement in a direction corresponding to the direction of the pulse energy emission from the antenna, whenever an energy pulse is emitted, the electron beam is modulated, in response to reception of reflected energy pulses corresponding to the energy pulse emitted at the instant radial movement of the electron beam initiated, when the same occupies a certain radial distance from the center of the oscillograph screen that is a direct measurement of range of the object from which the energy pulse reflected, while the angular position of the radial sweep at the instant the indication is produced thereon indicates the direction, or azimuth angle, of such object.

In the event that more accurate range and directional indications of a certain remote object detected in the foregoing manner is desired, the radial sweep of the electron beam is expanded by increasing the amplitude of the saw-tooth current wave forms by adjustment of control 52, and supply 49 is regulated to apply a source of direct current to deflection coils 46, 46 to produce a uni-directional electromagnetic field that deflects the electron beam in a direction determined by the angular position of the deflection coils. The angular position of deflection coils 46, 46 is varied, upon rotation of knob 43, to occupy a position wherein the electron beam is deflected in a direction substantially opposite the direction of the remote object of which an indication is desired, with respect to the antenna, while the current fed to the deflection coils is regulated in such a manner as to move the electron beam to a new point of rotation that is sufficient distance in the aforesaid direction from the center of the oscillograph screen so that the expanded radial sweep utilizes the entire diameter of the screen. Since deflection coils 46, 46 are capable of rotation throughout 360° any remote object included within the scanned area may be individually indicated in the foregoing manner.

There is thus provided by the present invention novel methods of and means for simultaneously indicating range and direction, or the azimuth angle, of remote objects on the screen of an oscillograph, or any other suitable indicating device. The novel means disclosed and described herein is so characterized that a visual plan position indication of all remote objects included within an area extending 360° about a reference point is readily obtained, wherein remote objects are indicated on the viewing screen of an oscillograph at radial and angular positions with respect to the center of the screen that respectively correspond to ranges and azimuth angles of remote objects with respect to the reference point. Furthermore, the present invention provides novel electromagnetic means for producing an extremely stable radial sweep of the electron beam of an oscilligraph and for rotating the sweep in synchronism with rotation of a remote rotatable member with a high degree of accuracy, as well as providing other novel means for varying the point about which the radial sweep rotates to any desired position so that extremely accurate range and directional indications of preselected remote objects may be readily obtained.

Although several modifications of the present invention have been shown and described in detail herein, it is to be expressly understood that various changes and substitutions may be made therein without departing from the spirit of the invention as well understood by those skilled in the art. Reference therefore will be had to the appended claims as a definition of the limits of the invention.

The invention described herein may be manufactured and used by or for the Government of the United States of America for governmental purposes without the payment of any royalties thereon or therefor.

What is claimed is:

1. In an apparatus for indicating range and azimuth of remote objects, means producing a directional pulse energy emission, means rotating said directional pulse energy emission, an oscillograph, a plurality of deflection coils rotatably mounted on said oscillograph, means applying saw-tooth currents synchronized with said directional pulse emission to said coils for producing a radial sweep of the electron beam of said oscillograph, means rotating said coils in synchronism with rotation of said direction pulse energy emission whereby said sweep rotates in synchronism with rotation of said directional pulse energy emission, means producing indications on said sweep when said pulse energy impinges upon and are reflected from remote objects whereby range of said remote objects is represented on said sweep by the distance of said indications from one end thereof, and whereby azimuth of said remote objects is presented from the angular displacement of said sweep at the instant said indications are produced thereon.

2. In an apparatus for indicating range and azimuth of remote objects, means producing a directional pulse energy emission, means rotating said directional pulse emission, an oscillograph, a plurality of deflection coils rotatably mounted on said oscillograph, means applying saw-tooth currents synchronized with said directional pulse emission to said coils for producing a radial sweep of the electron beam of said oscillograph, means applying saw-tooth currents synchronized with said directional pulse emission to said coils for producing a radial sweep of the electron beam of said oscillograph, means rotating said coils in synchronism with rotation of said directional pulse emission whereby said sweep rotates in synchronism with rotation of said directional pulse emission, means supplying a source of direct current to said coils for rotating said sweep about a fixed point, means producing indications on said sweep when said directional pulses impinge upon and reflect from remote objects whereby range of said remote objects is represented on said sweep by the distance of said indications from one end thereof, and whereby azimuth of said remote objects is represented from the angular displacement of said sweep when said indications are produced thereon.

3. In an apparatus for indicating range and azimuth of remote objects, means producing a directional pulse energy emission, means rotating said directional pulse energy emission, an oscillograph, a plurality of deflection coils rotatably mounted on said oscillograph, means applying saw-tooth currents synchronized with said directional pulse energy emission to said coils for producing a radial sweep of the electron beam of said oscillograph, means rotating said coils in synchronism with rotation of said directional pulse energy emission whereby said sweep rotates in synchronism with rotation of said directional pulse energy emission, means producing indications on said sweep when said energy pulses impinge upon and reflect from remote objects whereby range of said remote objects is represented on said sweep by the distance of said indications from one end thereof, whereby azimuth of said remote objects is represented from the angular displacement of said sweep when said indications are produced thereon, a second set of deflection coils rotatably mounted on said oscillograph, means supplying direct current to said second set, and manually operable means for rotating said second set to vary the position of the point about which said sweep rotates.

4. In an apparatus for indicating range and azimuth of remote objects, means producing a directional pulse energy emission, means rotating said directional pulse energy emission, an oscillograph, a plurality of deflection coils rotatably mounted on said oscillograph, means applying saw-tooth currents synchronized with said directional pulse energy emission to said coils for producing a radial sweep of the electron beam of said oscillograph, means rotating said coils in synchronism with rotation of said directional pulse energy emission whereby said sweep rotates in synchronism with rotation of said directional pulse energy emission, means producing indications on said sweep when said energy pulses impinge upon and reflect from remote objects whereby range of said remote objects is represented on said sweep by the distance of said indications from one end thereof and whereby azimuth of said remote objects is represented from the angular displacement of said sweep at the instant said indications are produced thereon, a second set of deflection coils rotatably mounted on said oscillograph, means applying direct current to said second set of coils for displacing the point about which said radial sweep rotates, means varying said direct current for controlling the degree of displacement of said point, means varying the amplitude of said saw-tooth currents for expanding the radial movement of said electron beam and means rotating said second set of coils for varying the angular position of said displaced point.

5. An apparatus for indicating continually the position of a remote rotatable member on an oscillograph comprising, constant amplitude magnetic sweep producing means disposed outside of said oscillograph producing a periodic constant amplitude sweep of the electron beam of said oscillograph throughout a radius of said oscillograph having a fixed orientation relative to said means, and means synchronized with said remote rotatable member rotating said magnetic sweep producing means in synchronism with the rotation of said member to rotate said sweep about its center-most end.

6. In an apparatus for indicating range and azimuth of remote objects, means producing a directional pulse energy emission, means rotating said directional energy emission in azimuth, a cathode ray tube indicator, constant amplitude magnetic sweep producing means disposed outside of said cathode ray tube indicator producing a periodic constant amplitude sweep of the electron beam of said indicator throughout a radius thereof having a fixed orientation relative to said magnetic sweep producing means, the initiation of said sweep being synchronized with the emission of energy, means synchronized with said means rotating said directional energy emission for rotating said magnetic sweep producing means in synchronism with the rotation of said directional energy emission, means modulating the electron beam of said cathode ray tube indicator for producing indications on said indicator in response to the receipt of said directional energy emission after reflection, whereby range of said remote objects is represented by a radial measurement of the indications on said sweep and whereby azimuth of said remote objects is obtained from the angular position of said sweep at the instant said indications are produced.

ROBERT M. PAGE.

REFERENCES CITED

The following references are of record in the file of this patent:

UNITED STATES PATENTS

| Number | Name | Date |
| --- | --- | --- |
| 1,535,329 | MacGregor-Morris et al. | Apr. 28, 1925 |
| 1,768,262 | Marrison | June 24, 1930 |
| 2,007,380 | Morlock | July 9, 1935 |
| 2,143,035 | Smith | Jan. 10, 1939 |
| 2,151,917 | Hyland | Mar. 28, 1939 |
| 2,189,549 | Hershberger | Feb. 6, 1940 |
| 2,211,614 | Bowie | Aug. 13, 1940 |
| 2,224,933 | Schlesinger | Dec. 17, 1940 |
| 2,231,929 | Lyman | Feb. 18, 1941 |
| 2,241,809 | De Forest | May 13, 1941 |
| 2,263,377 | Busignies et al. | Nov. 18, 1941 |
| 2,313,966 | Poch | Mar. 16, 1943 |
| 2,400,791 | Tolson | May 21, 1946 |
| 2,412,631 | Rice | Dec. 17, 1946 |
| 2,468,032 | Busignies | Apr. 26, 1949 |
| 2,541,030 | Busignies | Feb. 13, 1951 |

FOREIGN PATENTS

| Number | Country | Date |
| --- | --- | --- |
| 494,263 | Great Britain | Oct. 24, 1938 |
| 108,556 | Australia | Sept. 14, 1939 |
| 864,375 | France | Apr. 25, 1941 |